US007262784B2

United States Patent
Wang

(10) Patent No.: US 7,262,784 B2
(45) Date of Patent: Aug. 28, 2007

(54) LCD CONTROLLER TO HOLD A FIXED IMAGE ASPECT RATIO

(75) Inventor: Ming Huang Wang, Hsihchu (TW)

(73) Assignee: Etron Technology, Inc., Hsin-Chu (TW)

(*) Notice: Subject to any disclaimer, the term of this patent is extended or adjusted under 35 U.S.C. 154(b) by 240 days.

(21) Appl. No.: 10/428,892

(22) Filed: May 2, 2003

(65) Prior Publication Data

US 2004/0217982 A1 Nov. 4, 2004

(51) Int. Cl.
*G09G 5/02* (2006.01)
*H04N 7/01* (2006.01)

(52) U.S. Cl. ........................ 345/699; 345/3.3; 345/3.4; 345/698; 348/445

(58) Field of Classification Search .......... 345/3.1–3.4, 345/698, 699, 670, 660, 626, 204; 348/458, 348/459, 445, 556
See application file for complete search history.

(56) References Cited

U.S. PATENT DOCUMENTS

| | | | | |
|---|---|---|---|---|
| 5,592,194 | A * | 1/1997 | Nishikawa | 345/667 |
| 5,748,175 | A | 5/1998 | Shimada et al. | 345/127 |
| 5,983,247 | A | 11/1999 | Yamanaka et al. | 707/526 |
| 6,097,437 | A * | 8/2000 | Hwang | 348/441 |
| 6,191,820 | B1 | 2/2001 | Kang et al. | 348/445 |
| 6,275,306 | B1 | 8/2001 | Wataya et al. | 358/445 |

* cited by examiner

*Primary Examiner*—Duc Dinh
(74) *Attorney, Agent, or Firm*—Saile Ackerman LLC; Stephen B. Ackerman

(57) ABSTRACT

A circuit and a method for maintaining the aspect ratio of images when there is a difference in format between image sources and display panels is provided. Lines are added in the vertical direction both at the top and at the bottom of the display panel in order to make the display panel have the same aspect ratio as the input image. A line enable signal is used to expand the vertical lines to maintain aspect ratio. Previously, the period of line enable signals could not be programmed to vary sufficiently to yield the necessary expansion to allow the aspect ratio of the display panel image to match the aspect ratio of the source image. This design allows the period of the line enable signal to vary enough to match all reasonable aspect ratios of input images.

30 Claims, 7 Drawing Sheets

LCD CONTROLLER TO HOLD A FIXED IMAGE ASPECT RATIO

BACKGROUND OF THE INVENTION

1. Field of the Invention

The present invention generally relates to the general problem of keeping the aspect ratio of images when there is a difference in format between image sources and display panels. More particularly, this invention relates to a circuit and a method for holding a fixed aspect ratio when converting image formats to specific display formats.

2. Description of the Prior Art

FIG. 1*a* shows a prior art illustration of what happens when a circular source image for a computer display 110 of a given resolution is up-scaled or magnified 150, to a larger format 120. The up-scaled image on the display is distorted. It no longer looks like a circle, but it now looks like an ellipse 120. The original source image was stored in an XGA format of 1024×768 pixels. This resolution of 1024×768 has an aspect ratio of 1024/768=4/3. The display panel format in FIG. 1*a* is 1280×1024 or SXGA format. This resolution of 1280×1024 has an aspect ratio of 1280/1024=5/4. The result of a different aspect ratio is a distorted circle on the display.

FIG. 1*b* shows a prior art illustration of what happens when a circular source image 130 of a given resolution is downscaled 160 or de-magnified, to a smaller pixel format. The downscaled image 140 on the display is distorted. It no longer looks like a circle, but it now looks like an ellipse 140. The original source image was stored in a VXGA format of 1600×1200 pixels. This resolution of 1600×1200 has an aspect ratio of 1600/1200=4/3. The display panel format in FIG. 1*b* is 1280×1024 or SXGA format. This output panel resolution of 1280×1024 has an aspect ratio of 1280/1024=5/4. The result of a different aspect ratio creates a distorted circle on the display.

In the prior art, the general image formats currently used with different aspect ratios are below.

VGA: 640×480=4×3 (aspect ratio=1.33)
SVGA: 800×600=4×3 (aspect ratio=1.33)
XGA: 1024×768=4×3 (aspect ratio=1.33)
SXGA: 1280×1024=5×4 (aspect ratio=1.25)
UXGA: 1600×1200=4×3 (aspect ratio=1.33)

When an LCD (or other computer display) controller transfers the input source signal to the display panel the difference in format between the source signal and the target panel is considered. The problem encountered in the prior art is the requirement to keep the aspect ratios the same during the transition from image source to the display panel. In the prior art, when converting VGA, XGA and UXGA signals from the source to a display panel such as an SXGA panel, there are aspect ratio changes to be solved. If the aspect ratio changes are not solved, the images displayed at the panel will be distorted as seen in FIGS. 1*a* and 1*b*.

U.S. Pat. No. 5,748,175 (Shimada, et al.) "LCD Driving Apparatus Allowing for Multiple Aspect Resolution" describes a LCD driver apparatus which allows for multiple aspect resolutions.

U.S. Pat. No. 6,275,306 (Wataya, et al.) "Image Processing System Converting the Pixel Aspect Ratio" discloses an image processing system which converts the pixel aspect ratio.

U.S. Pat. No. 6,191,820 (Kang, et al.) "Device and Method for Converting Aspect Ratio of Video Signal" describes a device and a method for converting the aspect ratio of a video signal.

U.S. Pat. No. 5,983,247 (Yamanaka, et al.) "Data Conversion Apparatus for Reading a Document for a Display Screen and Generating a Display Image for Another Display Screen Which Has a Different Aspect Ratio from the Former Display Screen" discloses a data conversion apparatus for reading a document for a display screen and creating an image for another screen which has a different aspect ratio from the other display screen.

SUMMARY OF THE INVENTION

It is therefore an object of the present invention to provide a circuit and a method for maintaining the aspect ratio of images when there is a difference in format between image sources and display panels. It is further an object of this invention to provide a circuit and a method for holding a fixed aspect ratio when converting image formats to specific display formats.

The objects of this invention are achieved by a liquid crystal display, LCD (or other computer display) controller to hold a fixed image aspect ratio. This controller is made up in part of an R/G/B frame mask circuit, a primary vertical sync, Vsync' generator, which connects to a secondary vertical sync, Vsync" generator, which connects to a line enable, LE generator, and a line enable LE generator. The R/G/B, red/green/blue, frame mask circuit has red/blue/green, R/G/B signals and a frame mask as inputs. The R/G/B frame mask circuit has red'/green'/blue' R'/G'/B' signals as outputs. Also, this R/G/B frame mask circuit disables the input signals R/G/B in a desired or masked region of an LCD screen. The primary vertical sync, Vsync' generator has a main vertical sync, Vsync, signal, an inverse frame-mask signal, and an 'x' signal as inputs. Also, the Vsync' generator has a primary vertical sync, Vsync' as an output. The Vsync' generator converts the main Vsync signal to the Vsync' signal. The secondary vertical sync, Vsync" generator has the primary vertical sync, Vsync', and a sum of a Vtotal minus the x signal and a Vstart minus Vpreamble signal as inputs. In addition, the Vsync" generator has a secondary vertical sync, Vsync", as an output. The Vsync" generator converts the Vsync' signal to the Vsync" signal. The Line Enable, LE generator has Vsync", a V_preamble and a Vactive signal as inputs. The LE generator has a Line Enable, LE signal as an output. Also, the LE generator converts the Vsync" signal, combined with the V_preamble and the Vactive signals to the LE signal.

The key aspect of this invention is the use of a line enable, LE signal to control the aspect ratio of the display. The LE signal is expanded to add display panel lines in the vertical direction in order to preserve the aspect ratio from the source image to the desired display panel.

The above and other objects, features and advantages of the present invention will be better understood from the following detailed description taken in conjunction with the accompanying drawings.

DESCRIPTION OF THE PREFERRED EMBODIMENT

Figure 1A:
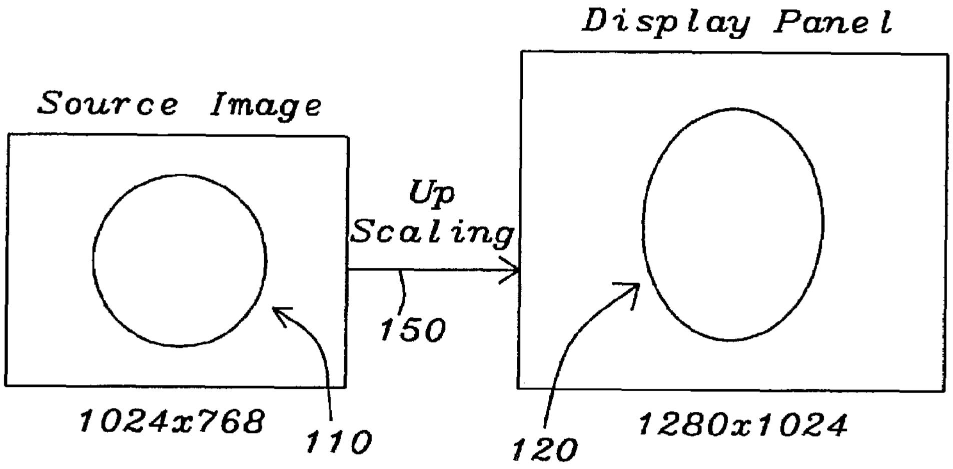
FIG. 1*a* shows a prior art diagram illustrating the distortion that occurs when the image and screen have different aspect ratios during up-scaling or magnification.
Figure 1B:
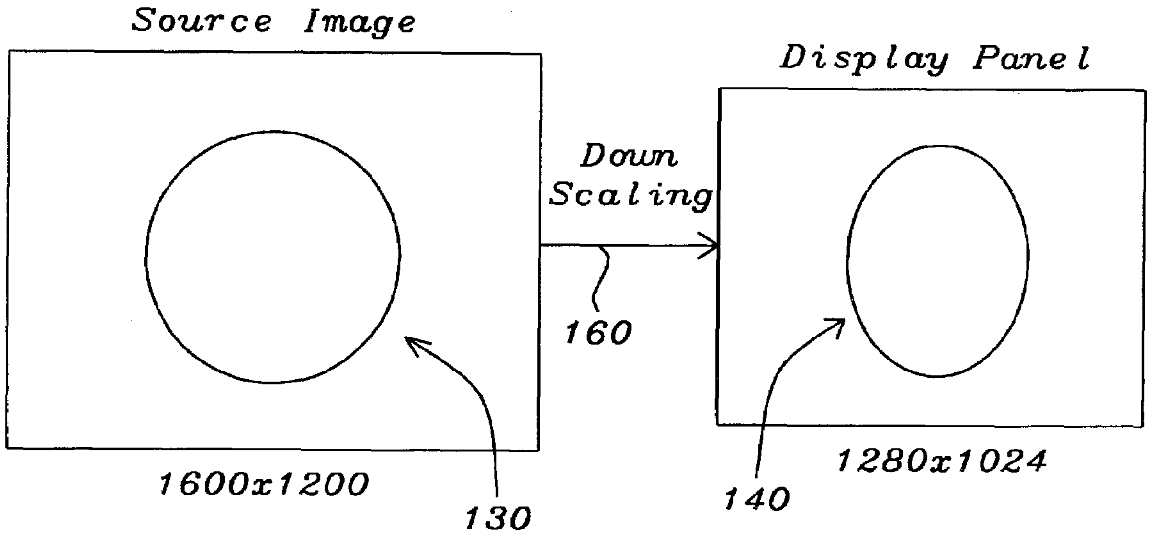
FIG. 1*b* shows a prior art diagram illustrating the distortion that occurs when the image and screen have different aspect ratios during down-scaling or reduction.
Figure 2A:
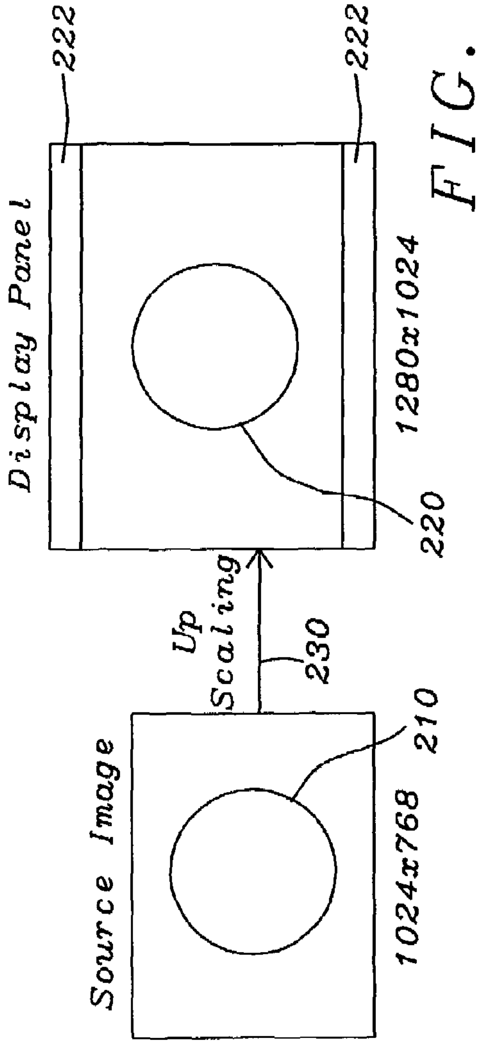
FIG. 2*a* shows an example of keeping the aspect ratio the same between the source image and the display panel before the scaling process.

FIG. 2*a* illustrates pictorially a resulting image when using the method and circuit of this invention. The circular source image 210 has a 1024×768 pixel format. This translates into a 4/3=1.33 aspect ratio. Before the magnification or up-scaling 230 mathematical mapping takes place, the number of active lines in the vertical direction of the LCD display panel have been increased, as indicated by area 222.

Figure 2B:
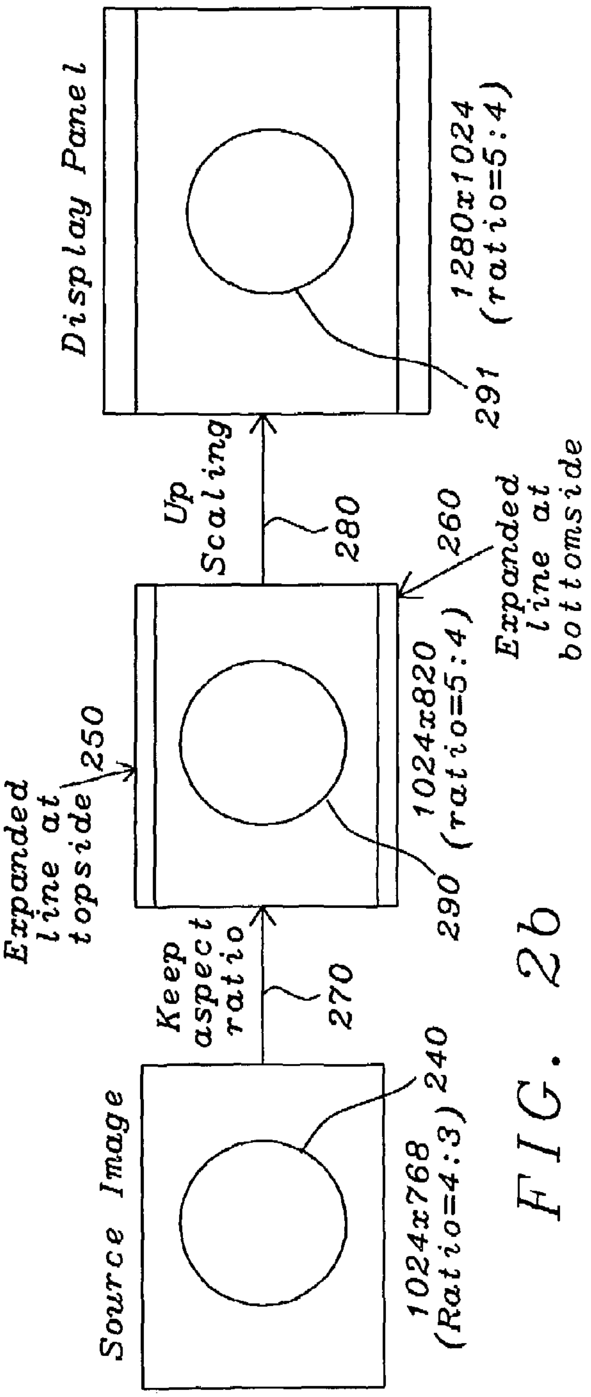
FIG. 2*b* shows more detail of the example in FIG. 2*a* of keeping the aspect ratio the same between the source image and the display panel before the scaling process.

FIG. 2*a* shows the end result of up-scaling or magnification 220. The display panel displays an enlarged circle without elliptical distortion. The resultant display on the LCD contains 1280×1024 pixels. The aspect ratio of 1280×1024 (1280/1024=1.25) matches the aspect ratio of the source image (1024/820=1.25). This is the global view of this process. Next, the intermediate steps will be reviewed. FIG. 2*b* shows more detailed steps of this main embodiment of this invention. The source image 240 is again shown with a 1024×768 (1024/768=4/3=1.33) format. The first transition step shows the source image receiving extra vertical lines. The source image is expanded at the top as denoted by the label "expanded lines at topside" 250. In addition, the source image is expanded at the bottom as denoted by the label "expanded lines at bottom side" 290. This intermediate source image has a format of 1024×820 (1024/820=5/4=1.25). The source image mapping was not modified between step 1 and intermediate step 2. The only thing that was done was add 52 lines in the vertical direction. This includes 26 lines at the top of the source image and 26 lines at the bottom of the source image.

The aspect ratio of the overall source image changed from 1024×768 (1024/768=4/3=1.33) to 1024×820 (1024/820=5/4=1.25). However, the aspect ratio of the original circle 240 did not change 270 in step 2 since the circle pixels were untouched 290. The only thing that changed between step 1 (240) and step 2 (290) are the lines in the vertical direction that were added to the source image.

Next, FIG. 2*b* shows the third step of up-scaling or magnification 280. The circle from step 2 (290) undergoes a mathematical mapping for magnification or up-scaling 280. The resultant figure is a perfect circle 291 without elliptical distortion. The display panel format is 1280×1024 (1280/1024=5/4=1.25). Since the aspect ratio of the display panel and the modified source image in step 2 (290) match, the magnification of the smaller circle in the step 2 source image 290 results in a magnified larger circle 291 without distortion.

In summary, the key to this invention is the first step of expanding the source image with additional lines in the vertical direction both at the top and the bottom of the source image. This first step allows the mapping of the circle from the intermediate image to the display panel to occur with common aspect ratio.

Figure 3:
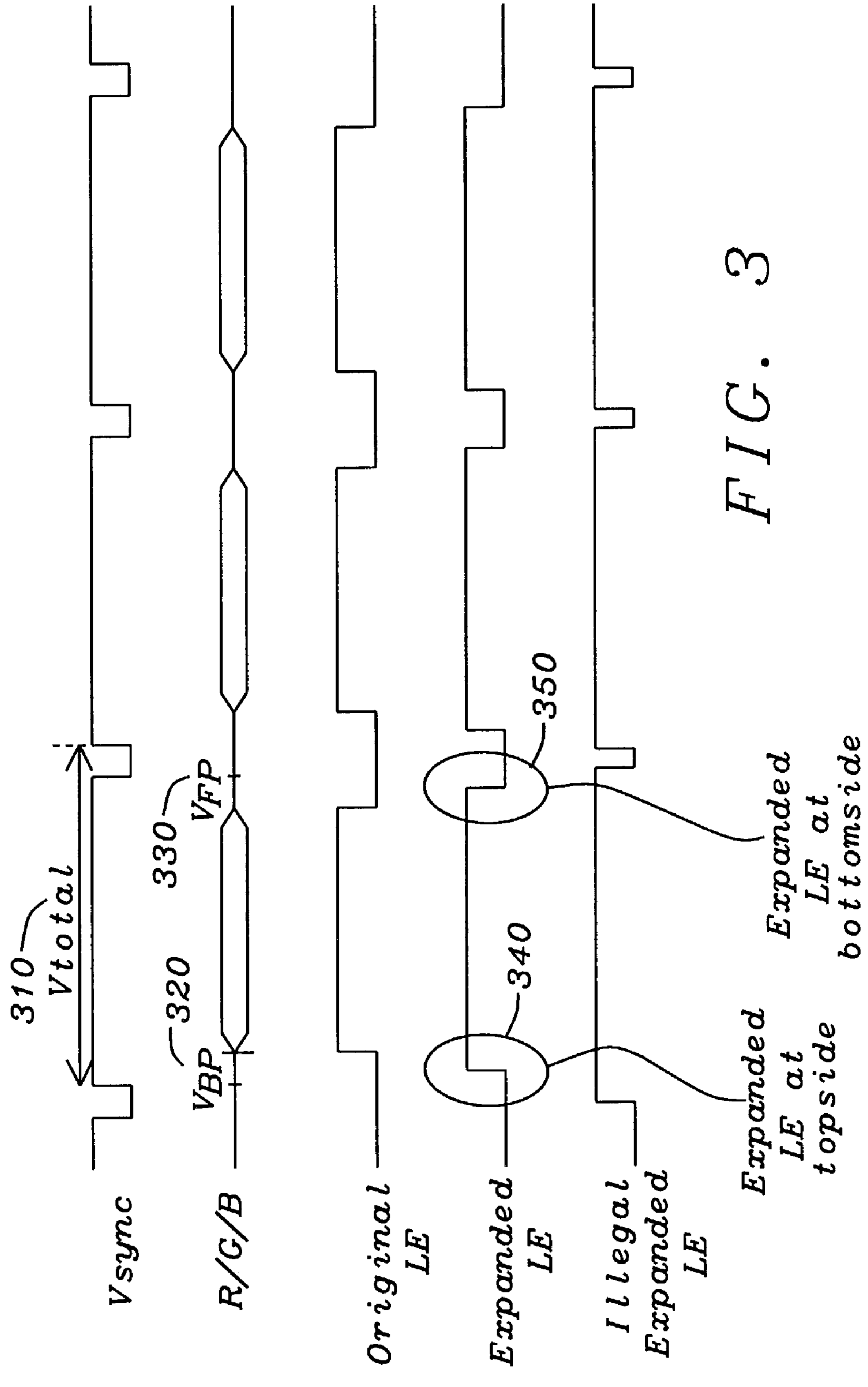
FIG. 3 is a timing diagram which illustrates the basic method of expanding the Line Enable signal to add display panel lines in the vertical direction in order to preserve aspect ratio.

FIG. 3 shows a timing diagram of the key signals, which make up an embodiment of this invention. This invention requires that the number of vertical lines be expanded at the top of the source image and at the bottom of the source image. In order to expand the number of lines in the vertical direction, the Line Enable, LE signal must be expanded as shown 340, 350. The rising edge 340 of the expanded LE in FIG. 3 must move to the left in order to increase the number of vertical lines at the top edge of the display. However, there is a limit to how far to the left the rising edge of LE 340 can be moved. The rising edge of LE 340 can be moved. The rising edge of LE 340 must occur after the rising edge of Vsync in FIG. 3. Also, the rising edge of LE 340 must occur within the vertical back porch period 320 as shown in FIG. 3.

The falling edge 350 of the expanded LE in FIG. 3 must move to the right in order to increase the number of vertical lines at the bottom edge of the display. However, there is a limit to how far to the right the falling edge of LE 350 can be moved. The falling edge of LE 350 must occur before the falling edge of Vsync in FIG. 3. Also, the falling edge of LE 350 must occur within the vertical front porch period 330, as shown in FIG. 3. Therefore, the period of LE is limited by the period of Vsync.

Figure 4:
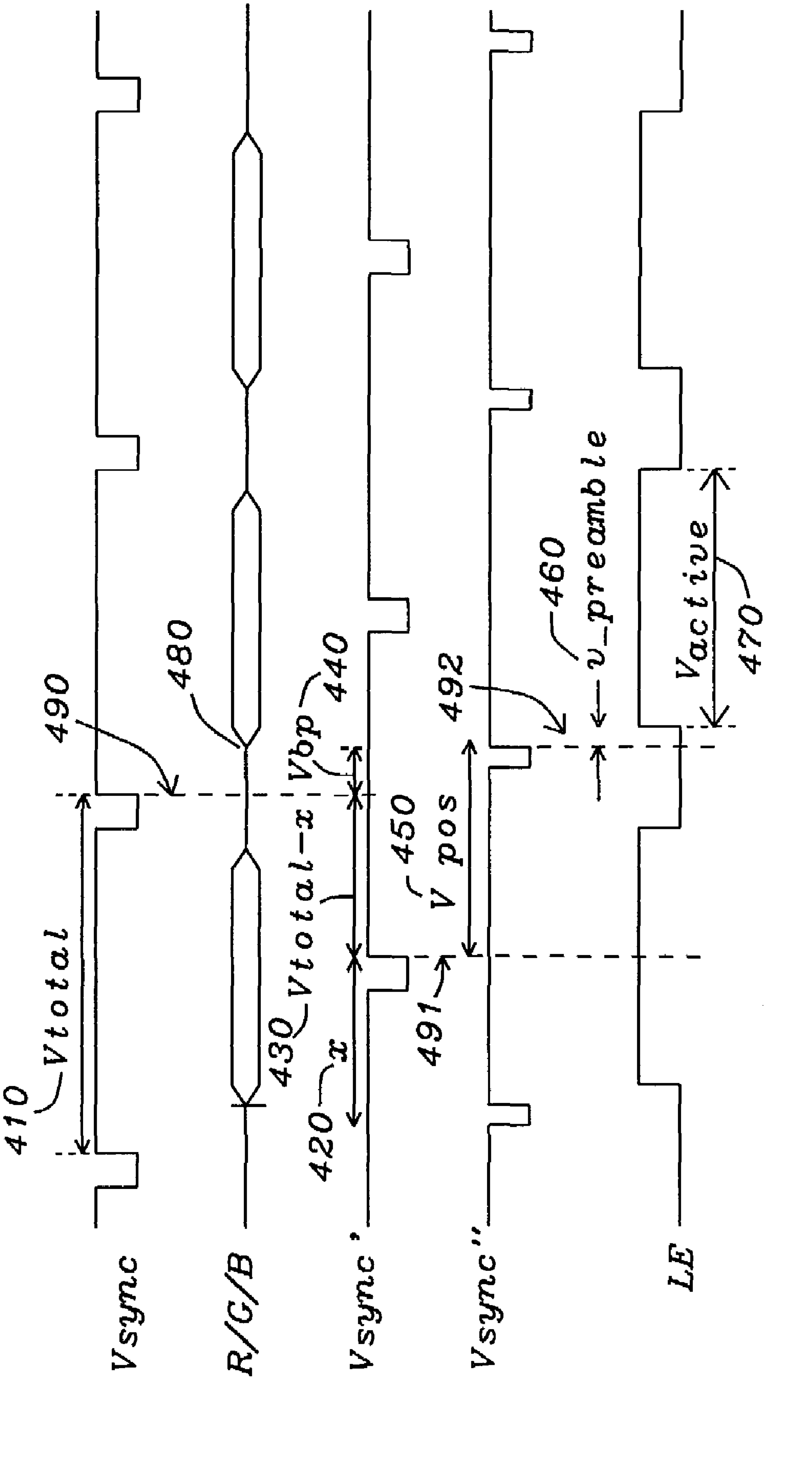
FIG. 4 is a timing diagram which illustrates the more novel method of this invention for expanding the Line Enable signal to add display panel lines in the vertical direction in order to preserve aspect ratio.

FIG. 4 shows a timing diagram, which illustrates a novel key aspect ratio method of this invention. FIG. 4 illustrates the case of the disabling of the key-aspect ratio. This method does not limit the period of LE by the period of Vsync as mentioned in the above paragraphs.

In FIG. 4, the rise of LE is positioned or programmed to be equal to Vpos 450+V_preamble 460 from the rise of Vsync 491. Also, as can be seen from FIG. 4, the fall of LE is positioned by a signal called, Vactive 470, from the rise of LE. The rise of Vsync' 491 is positioned by a signal 'x' 420 from the rise of Vsync. Other signals shown in FIG. 4 are Vtotal 410 which is the period of Vsync. Vbp 440 is the vertical backporch. Vstart is Vbp plus 1 (480). Vstart is where in time the first vertical line is displayed. Notice FIG. 4 does not have the keep-aspect ratio function 'on', since there is no expansion of the LE signal at the top of the display or at the bottom of the display.

Figure 5A:
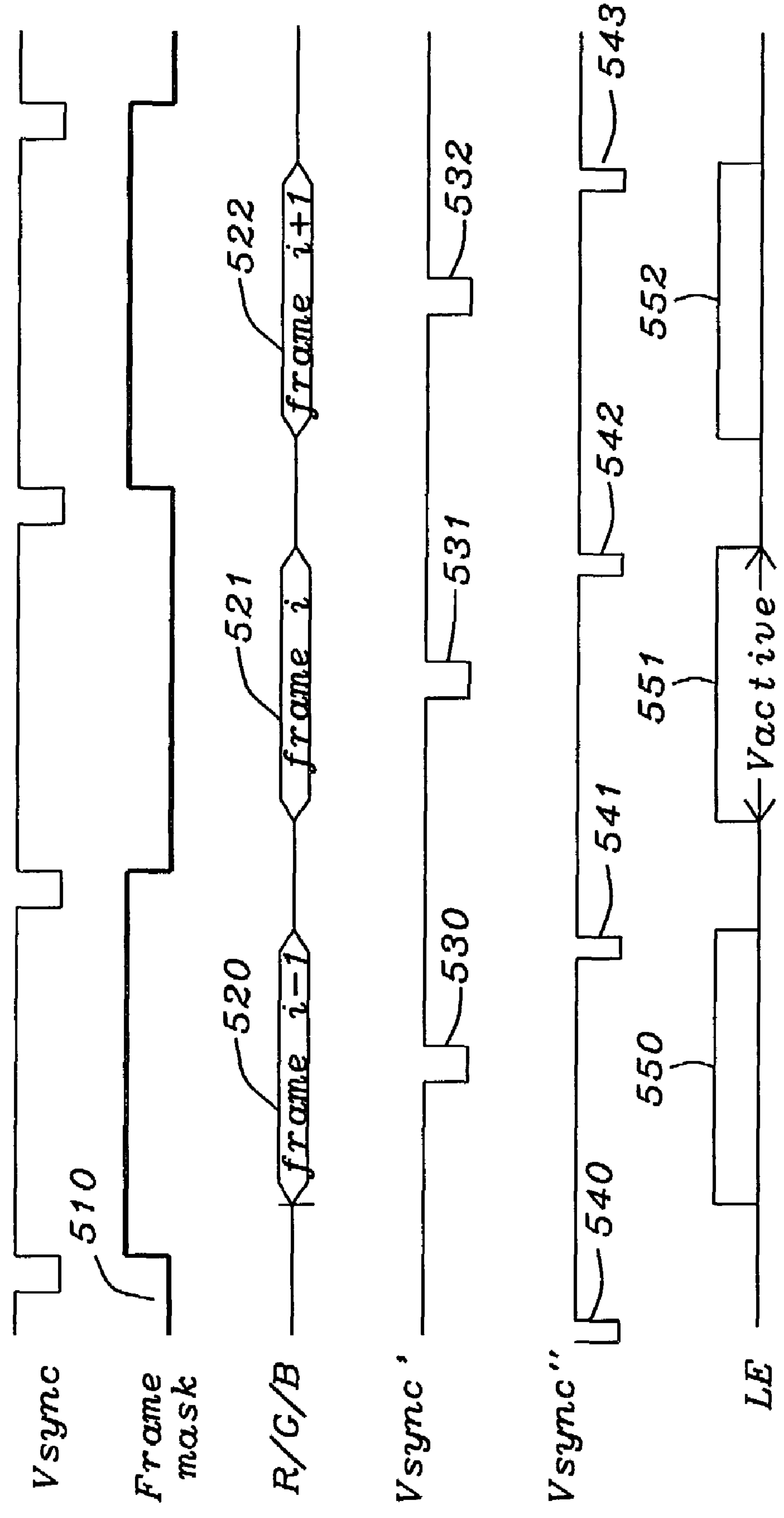
FIG. 5*a* is a timing diagram which shows keep-aspect ratio function enable, but not expanded extra lines at vertical direction.
Figure 5B:
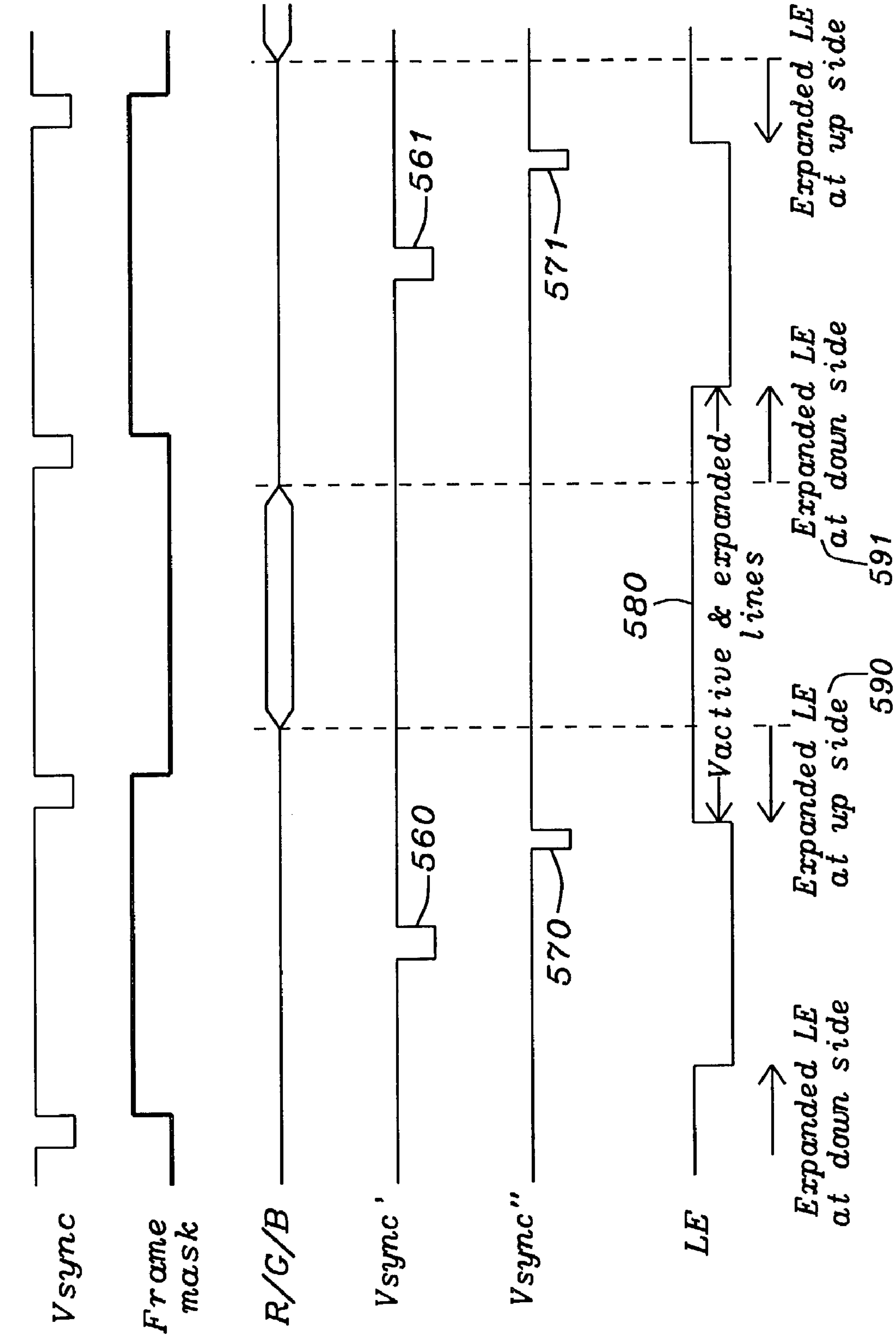
FIG. 5*b* is a timing diagram which shows keep-aspect ratio function enable, and expanded extra lines at vertical direction.

FIG. 5*b* shows the case where the keep-aspect ratio function is enabled. This is illustrated by the expanded LE at the top side of the display and the expanded LE at the bottom side of the display.

Figure 6:
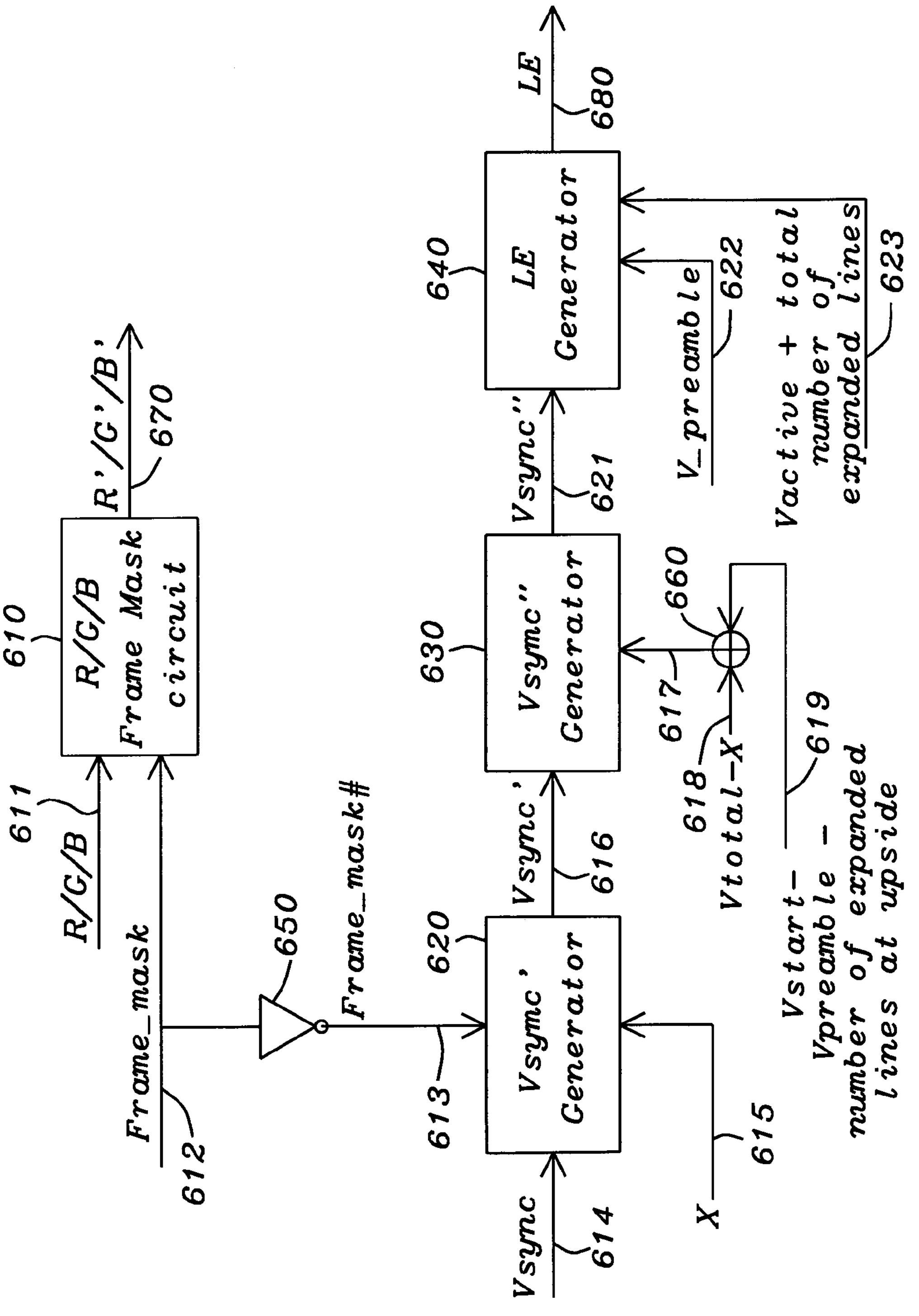
FIG. 6 shows a block diagram of the LCD controller of this invention.

FIG. 6 shows the block diagram of the display controller of this invention. The R/G/B frame mask circuit 610 is shown. Its output is the R'/G'/B' 670 signals. Its inputs are R/G/B 611 and the frame_mask 612. The frame_mask is used to disable the refresh of the display while the frame_mask signal is high. Therefore, in FIG. 5*a*, frame i−1 (520) and frame i+1 (522) are not displayed. However, frame i (520) is displayed. Similarly, the high frame_mask during frame i−1 time 520 causes Vsync' 531 to be disabled. It also causes Vsync" 542 to be disabled.

FIG. 5*a* and 5*b* shows the case where the keep-aspect ratio function is enabled. FIG. 5*a* shows the internal waveform at keep-aspect ratio function enable, but there are not any expanded extra lines at vertical direction. On this condition, we employed a mask signal 510, named Frame-mask, to disable R/G/B signal of frame I−1 (520), frame I+1 (522), and to disable reference signal Vsync' 531, Vsync" 540, Vsync" 542, and to disable LE 550, 552. As in FIG. 4, the rise of LE 551 is set by Vsync" 541. If the expanded extra lines at vertical direction is necessary, the Vsync" 541 have to be moved to the left (or early) position as Vsync" 570 by the number of expanded lines at up side 590, and then it can extend the rising edge of LE from 551 to 580. Vsync" acts as the initial reference point of LE. Hence, one important rule that cannot be violated is as follows. The Vsync" must always occur after the falling edge of the previous LE 550.

If the rule is violated, in other words, when Vsync" 541 goes into the active region of 550, the LE 550 will be truncated and finished abnormally by Vsync" 541. In order to get a maximum capability of expanded LE number, we have to eliminate this limitation. The most useful and straight forward way is to mask the frame signal R/G/B every other frame, such as frame I−1 (520), frame I+1 (522), . . . and so on. Now, every Vsync" 570 can be moved left (or early) until the position of the trailing edge of Vsync' 560. That means the expanded LE at up side 590 has inserted the maximum number of extend lines.

About the falling edge of LE 551, it will also be extended by expanded line at down side 591, and it will also be limited by next Vsync" 542. Hence, it is necessary to disable frame signal 522, LE 552 and Vsync" 542 of next frame I+1.

When frame signals such as 522 are masked, then LE 552 is not necessary. And when LE 552 is disabled, then Vsync" 542 is not necessary. By the same way, Vsync' 531 is disabled due to Vsync" 542 being disabled.

In FIG. 6, the Frame_mask 612 is inverted by the inverter 650 to produce the negative Frame_mask 613. FIG. 6 shows a primary vertical sync signal. Vsync' generator 620 and a secondary vertical sync signal, Vsync" generator 630. The inverted Frame_mask goes into the Vsync' generator block 620 along with the Vsync 614 signal and the 'x' signal 615. The 'x' signal represents a programmable time delay from a rising edge of the Vsync signal to a rising edge of the Vsync' signal in FIG. 6. The output of the Vsync' generator is the Vsync' signal. The Vsync' signal 616 is an input to the Vsync" generator 630. The sum function 660 of FIG. 6 adds Vtotal−x (618) and Vstart−V_preamble−number of expanded lines at up side (619). The result of this addition also goes into the Vsync" generator 630. The output of the Vsync' generator is Vsync" 621. The Vsync" signal 621 goes into the LE, line enable, generator 640. In addition, V_preamble 622 and Vactive+number of total expanded lines 623 go into the LE generator 640. The output of the LE generator 640 is LE 680.

The leading edge of LE is extended by the number of expanded lines at the up side. This result corresponds to the period 590 shown in FIG. 5*b*. Similarly, LE could be expanded on the down side. This result corresponds to the period 591 shown in FIG. 5*b*. The total period 580 of LE is also shown in FIG. 5*b*. Therefore with the addition of vertical lines at the top and/or the bottom of the screen, the aspect ratio of the image can be maintained on the display.

The key result of the LE signal that is produced by the LE generator is that the LE signal is expanded by adding display panel lines in the vertical direction in order to preserve aspect ratio.

The advantage of this invention is the use of a novel technique for extending the range of the possible periods of the line enable or LE signal. In the prior art and the conventional implementions of the keep-aspect ratio methods, the period of the LE signal cannot be programmed to vary sufficiently to yield the necessary expansion to allow the aspect ratio of the display panel image to match the aspect ratio of the source image. In this invention, generating special signals such as Vsync', Vsync" and LE, the main embodiment of the display controller can allow the period of the LE signal to vary enough to match all reasonable aspect ratios of input images.

While the invention has been described in terms of the preferred embodiments, those skilled in the art will recognize that various changes in form and details may be made without departing from the spirit and scope of the invention.

What is claimed is:

1. A liquid crystal display, LCD controller circuit to hold a fixed image aspect ratio comprising:

an R/G/B frame mask circuit;

a frame mask signal, which connects to said frame mask circuit of R/G/B, and a primary vertical sync, Vsync' generator;

said primary vertical sync, Vsync' generator, which connects to a secondary vertical sync, Vsync" generator;

said secondary vertical sync, Vsync" generator, which connects to a line enable, LE generator; and said line enable LE generator, wherein said Vsync' generator and said Vsync" generator are used to provide a range or continuum of screen formats, wherein said primary vertical sync, Vsync' generator has a main vertical sync, Vsync, signal, an inverse frame-mask signal, and an 'x' signal as inputs, wherein 'x' is a programmable time delay from a rising edge of said Vsync signal to a rising edge of said Vsync' signal.

2. The LCD controller circuit to hold a fixed image aspect ratio of claim 1 wherein said R/G/B, red/green/blue, frame mask circuit has red/blue/green, RIG/B signals and a frame mask as inputs.

3. The LCD controller circuit to hold a fixed image aspect ratio of claim 1 wherein said R/G/B frame mask circuit has red'/green'/blue' R'/G'/B' signals as outputs.

4. The LCD controller circuit to hold a fixed image aspect ratio of claim 1 wherein said R/G/B frame mask circuit disables said input signals R/G/B in a desired or masked region of an LCD screen.

5. The LCD controller circuit to hold a fixed image aspect ratio of claim 1 wherein said Vsync' generator has a primary vertical sync, Vsync' as an output.

6. The LCD controller circuit to hold a fixed image aspect ratio of claim 1 wherein said Vsync' generator converts said main Vsync signal to said Vsync' signal.

7. The LCD controller circuit to hold a fixed image aspect ratio of claim 1 wherein said secondary vertical sync, Vsync" generator has said primary vertical sync, Vsync', and a sum of a Vtotal minus said signal 'x' and a Vstart minus (V_preamble+number of expanded lines at up side) signal as inputs, wherein Vtotal is a time period of said Vsync signal and wherein Vstart is a time point where said R/G/B signals begin displaying on a display, wherein V_preamble is a time between the rise of said Vsync" and the rise of said line enable, LE signal.

8. The LCD controller circuit to hold a fixed image aspect ratio of claim 1 wherein said Vsync" generator has a secondary vertical sync, Vsync", as an output.

9. The LCD controller circuit to hold a fixed image aspect ratio of claim 1 wherein said Vsync" generator converts said Vsync' signal to said Vsync" signal.

10. The LCD controller circuit to hold a fixed image aspect ratio of claim 7 wherein said Line Enable, LE generator has said Vsync", said V_preamble, a Vactive signal and number of total expanded lines in one frame as inputs, wherein said Vactive signal defines the up time of said LE signal.

11. The LCD controller circuit to hold a fixed image aspect ratio of claim 10 wherein said LE generator has a Line Enable, LE signal as an output.

12. The LCD controller circuit to hold a fixed image aspect ratio of claim 11 wherein said LE generator converts said Vsync" signal, combined with said V_preamble and said Vactive signals and said number of total expanded lines in one frame to said LE signal.

13. The LCD controller to hold a fixed image aspect ratio of claim 11 wherein said LE signal has a leading edge extended to correspond to a number of expanded lines at an upside of a display.

14. The LCD controller to hold a fixed image aspect ratio of claim 11 wherein said LE signal has a trailing edge extended to correspond to a number of expanded lines at a downside of a display.

15. The LCD controller to hold a fixed image aspect ratio of claim 10 wherein said Vactive signal is combined with said number of total expanded lines using a counter in said LE generator to produce a required period for said LE signal.

16. A method of using a liquid crystal display, LCD controller to hold a fixed image aspect ratio comprising the steps:

providing an R/G/B frame mask circuit;

providing a framemask signal, which connects to said frame mask circuit of R/G/B, and a primary vertical sync, Vsync' generator:

providing said primary vertical sync, Vsync' generator, which connects to a secondary vertical sync, Vsync" generator;

providing said secondary vertical sync, Vsync" generator, which connects to a line enable, LE generator; and providing said line enable LE generator, wherein said Vsync' generator and said Vsync" generator are used to provide a range or continuum of screen formats, wherein said primary vertical sync, Vsync' generator has a main vertical sync, Vsync, signal, an inverse frame-mask signal, and an 'x' signal as inputs, wherein 'x' is a programmable time delay from a rising edge of said Vsync signal to a rising edge of said Vsync ' signal.

17. The method of using an LCD controller to hold a fixed image aspect ratio of claim 16 wherein said R/G/B, red/green/blue, frame mask circuit has red/blue/green, R/G/B signals and a frame mask as inputs.

18. The method of using an LCD controller to hold a fixed image aspect ratio of claim 16 wherein said R/G/B frame mask circuit has red'/green'/blue' R'/G'/B' signals as outputs.

19. The method of using an LCD controller to hold a fixed image aspect ratio of claim 16 wherein said R/G/B frame mask circuit disables said input signals R/G/B in a desired or masked region of an LCD screen.

20. The method of using an LCD controller to hold a fixed image aspect ratio of claim 16 wherein said Vsync' generator has a primary vertical sync, Vsync' as an output.

21. The method of using an LCD controller to hold a fixed image aspect ratio of claim 16 wherein said Vsync' generator converts said main Vsync signal to said Vsync' signal.

22. The method of using an LCD controller to hold a fixed image aspect ratio of claim 16 wherein said secondary vertical sync, Vsync" generator has said primary vertical sync, Vsync', and a sum of a Vtotal minus said signal 'x' and a Vstart minus (V_preamble+number of expanded lines at up side) signal as inputs, wherein Vtotal is a time period of said Vsync signal and wherein Vstart is a time point where said R/G/B signals begin displaying on a display, wherein V_preamble is a time between the rise of said Vsync" and the rise of said line enable, LE signal.

23. The method of using an LCD controller to hold a fixed image aspect ratio of claim 16 wherein said Vsync" generator has a secondary vertical sync, Vsync", as an output.

24. The method of using an LCD controller to hold a fixed image aspect ratio of claim 16 wherein said Vsync" generator converts said Vsync' signal to said Vsync" signal.

25. The method of using an LCD controller to hold a fixed image aspect ratio of claim 22 wherein said Line Enable, LE generator has said Vsync", a V_reamble and a Vactive signal as inputs.

26. The method of using an LCD controller to hold a fixed image aspect ratio of claim 25 wherein said LE generator has a Line Enable, LE signal as an output.

27. The method of using an LCD controller to hold a fixed image aspect ratio of claim 26 wherein said LE generator converts said Vsync" signal, combined with said V_preamble and said Vactive signals to said LE signal.

28. The method of using an LCD controller to hold a fixed image aspect ratio of claim 26 wherein said LE signal has a leading edge extended to correspond to a number of expanded lines at an upside of a display.

29. The method of using an LCD controller to hold a fixed image aspect ratio of claim 26 wherein said LE signal has a trailing edge extended to correspond to a number of expanded lines at a downside of a display.

30. The method of using an LCD controller to hold a fixed image aspect ratio of claim 25 wherein said Vactive signal is combined with said number of total expanded lines using a counter in said LE generator to produce a required period for said LE signal.

* * * * *

UNITED STATES PATENT AND TRADEMARK OFFICE

CERTIFICATE OF CORRECTION

PATENT NO. : 7,262,784 B2
APPLICATION NO. : 10/428892
DATED : August 28, 2007
INVENTOR(S) : Ming Hung Wang It is certified that error appears in the above-identified patent and that said Letters Patent is hereby corrected as shown below:

Title Page
In the Inventor, (75), delete "Ming Huang Wang, Hsihchu (TW): and replace with --Ming - Hung Wang, Hsinchu (TW) --.

Signed and Sealed this

Twenty-seventh Day of November, 2007

JON W. DUDAS
*Director of the United States Patent and Trademark Office*